Figure 1:
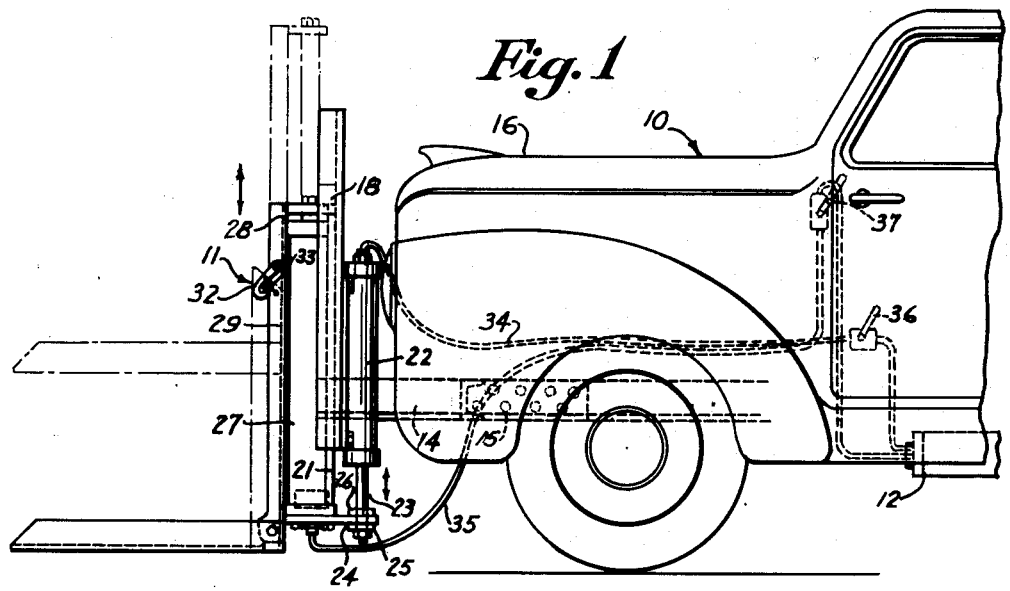

Sept. 29, 1953     H. LEHRMAN     2,653,678
LOADING AND UNLOADING ELEVATOR FOR TRUCKS
Filed Jan. 19, 1951

INVENTOR.
HARRY LEHRMAN
BY
ATTORNEYS

Patented Sept. 29, 1953

2,653,678

UNITED STATES PATENT OFFICE 2,653,678

LOADING AND UNLOADING ELEVATOR FOR TRUCKS

Harry Lehrman, Jersey City, N. J.

Application January 19, 1951, Serial No. 206,779

9 Claims. (Cl. 187—9)

1

This invention relates to a loading and unloading elevator in combination with an automotive truck.

In the transportation of merchandise by truck and especially trailer truck, heavy material is usually loaded or unloaded on the trailers with mechanical means such as hoists, cranes, or fork lift trucks. Where no equipment is available, the material is handled manually.

The object of this invention is to provide a fork-lift, crane, or elevator for a prime mover such as the tractor part of over-the-road tractor-trailer equipment for removing pallet loads, skid loads, unit loads or separate pieces of material from the bed of the trailer for placement upon the ground, platform, or any other location or for loading the material upon the trailer bed.

A further object is to facilitate the transportation of merchandise by motor truck.

Another object is to decrease the cost of freight transportation by motor truck.

Other objects of the instant invention will become apparent in the course of the following specification.

In the attainment of these objectives, the elevator is attached to the front of the truck in such a manner that it presents no obstacles to the driver on the highway but is readily available for loading and unloading another truck or in the case of a trailer truck loading and unloading the same truck.

The invention will appear more clearly from the following detailed description when taken in conjunction with the accompanying drawings showing by way of example a preferred embodiment of the inventive concept.

Figure 2:
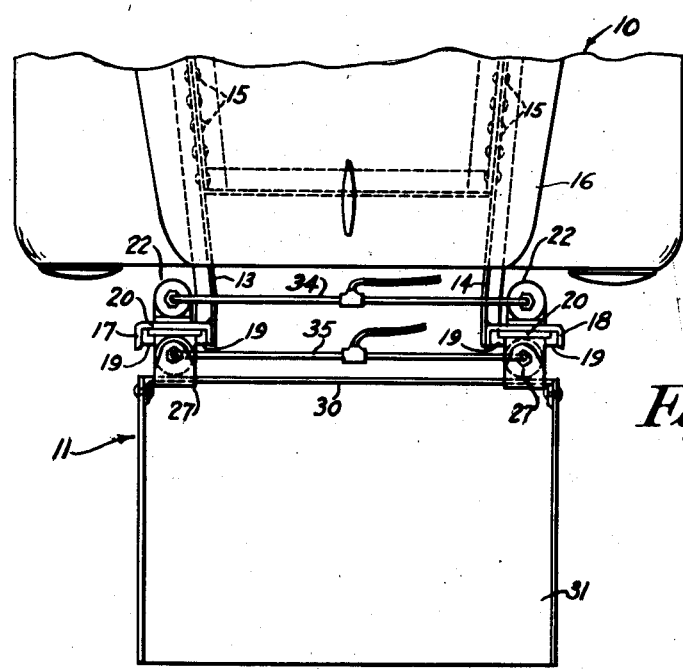

In the drawings:

Figure 1 is a front elevational view of the elevator attached to the front of a truck; and Figure 2 is a top plan view of the elevator and truck shown in Figure 1 with the platform of the elevator in operable position.

Referring now in greater detail to the drawings where like reference numerals indicate like parts, reference numeral 10 indicates the truck, and 11 the elevator or lift.

The truck 10 may be any of the conventional types but especially the truck trailer type in which the trailer is supported at the back of a detachable motor unit for movement along the highway but the motor unit of which can be readily detached from the trailer so that the subsequently described elevator can be moved to any position relative to the trailer for loading and unloading. While various types of equipment could be used for actuating the elevator, the truck 10 illustrated is equipped with a compressed air tank 12 which is supplied with air by any suitable pump (not shown). If desired, the compressed air mechanism manipulating the air brakes of the truck may be used.

The elevator 11 is constituted of the spaced horizontal angle iron supports 13 and 14, one end of each of which is attached by any suitable means 15 to each side of the chassis with the free end extended beyond the hood 16 of the truck.

Vertically attached to the extended ends of the angle iron supports are the channel members 17 and 18. Any suitable means may be used for attaching the bases of the channel irons in the angle irons, the means shown being welded. On the other hand, the channel members may be made removable for the attachment of a snow plow or the like. The channels of the members 17 and 18 are outwardly directed. Another channel member 19 is inserted in each of the channel members 17 and 18 but with the channels inwardly directed, that is the opposite to the direction of the channels of the members 17 and 18 to form similar guideways 20. Any suitable means may be used for securing the channel members together and the bottoms of the guideways are open while the outer surface of each member 19 is longitudinally slotted. Reciprocally inserted in the guideways are the guides 21, each guide being of sufficient length so that when the bottoms thereof move downwardly through the openings in the bottom of the guideways the upper portions will still be in the guideways.

Downwardly directed on the inner surface of each channel member 17 and 18 is a master piston 22 fastened to the channel members by any known means. The piston rod 23 of each master cylinder extends below the channel and the length of each piston rod is such that in the fully extended position it is substantially close to the ground.

Attached as desired to the end of each piston rod 23 is a horizontal member 24 which extends forwardly under the corresponding guideway. If desired, the horizontal member may be attached to the piston by the nut 25 after the piston rod has been passed through an opening in the horizontal member, the opposite side or top of the horizontal member being held by a collar 26 formed integral with the piston rod. The base of each guide 21 is attached by welding or the like to the corresponding horizontal member so that as the piston rods of the master pistons reciprocate the guides are simultaneously reciprocated in the guideways.

On the end of each horizontal member protruding beyond the guideways is an upwardly directed auxiliary piston 27 fastened to the corresponding horizontal member and adjacent the longitudinal slot in the corresponding guideway. Each cylinder of the auxiliary pistons is also fastened to the guide in the corresponding guideway by any suitable means passing through the longitudinal slot. The height of each auxiliary cylinder is approximately equal to the height of the truck hood.

To the free end of each piston rod 28 of the auxiliary pistons there is attached by any known means the horizontal portion of an L-shaped bracket 29 the upright portion of each of which extends downwardly and spaced from the front corresponding cylinder substantially to the plane of the horizontal members. Attached in any known manner between the downwardly directed ends of the brackets is a tie rod 30.

Hingedly disposed on the tie rod is the platform member 31 of the elevator which can be rotated from a plane perpendicular to the plane of the guideways to a plane substantially parallel thereto as shown by the dot dash line in Figure 1. Any suitable means (not shown) may be used for maintaining the platform perpendicular to the plane of the guideways when in the operating position while the latch 32 in coaction with the pin 33 may be used to maintain the platform 31 releasably upright.

All of the pistons are double acting and a pipe line 34 is used to connect the compressed air tank 12 with the master pistons 22 and the pipe line 35 similarly connects the auxiliary cylinders 27 with the tank 12. Each pipe line has a similar valve 36 located in the cab of the truck to control the flow of air between the tank and cylinders.

In operation:

Suppose that the elevator is attached to the motor unit of a truck trailer loaded with building material such as cement, brick, lath, etc., for transportation to several building sites. With the platform 31 of the elevator turned upwardly against the guideways and fastened in that position by the latch 32 and with the pistons of both the master and auxiliary cylinders fully retracted, the pistons of the master cylinders being held in the retracted position by the compressed air, the trailer truck can be driven over the highways in the usual manner and without obstructing the view of the driver. At the first building site, the trailer truck is stopped near the unloading point and the motor unit or tractor separated from the trailer in the usual manner. With the platform 31 unlatched and rotated to the horizontal position (Figs. 1 and 2), the motor unit is driven to that part of the trailer from which the building material is to be removed and with the platform directed toward the trailer. Suppose the problem is to remove the building material from the trailer to the ground. By operating the valve controlling the master cylinders, the horizontal members and guides together with the auxiliary cylinders can be moved downwardly as far as the ground. By operating the valve controlling the auxiliary cylinders, the platform can be elevated to the desired position for loading the material from the trailer to the platform and then reverse operated to lower the platform to the ground for the removal of the material thereto. With the unloading completed, and all the piston rods retracted into their respective cylinders and the platform rotated upwardly and fastened to the guideways, the motor unit is ready to be reattached to the trailer for the delivery of more building material in the same manner to the next building site.

Of course the elevator may be actuated hydraulically, mechanically, or electrically and the motor unit may be counter-balanced to offset the weights of the loads to be lifted. Hence, it will be understood that the invention is not limited to the exact disclosure herein described but may lend itself to a variety of expressions within the scope of the appended claims.

What is claimed is:

1. A loading and unloading elevator in combination with a motor truck having a compressed air source, the elevator comprising a vertical frame, the frame comprising a horizontal support disposed on each side of the truck chassis at the front, the supports extending forwardly of the hood in a horizontal plane, a U-shaped channel member vertically disposed on the extended end of each horizontal support and upwardly directed therefrom with the channels turned outwardly, a second channel member disposed in the outwardly directed channel of each first channel member, the channels of the second channel members being turned inwardly and forming guideways with the first channel members, each second channel member having a longitudinal slot in the outer surface thereof, a guide reciprocal in each guideway, means coacting with the compressed air source lowering the guides in the guideways to a position adjacent the ground with the guides in the guideways; a platform for the frame, and means coacting with the guides and the compressed air source vertically reciprocating the platform adjacent the channel members.

2. A loading and unloading elevator in combination with a motor truck having a compressed air source according to claim 1 in which the means coacting with the compressed air source lowering the guides in the guideways to a position adjacent the ground with the guides in the guideways comprises a downwardly directed master piston disposed on the outer surface of each first channel member, the piston rod of each master piston protruding below the guideways, a horizontal member disposed on the protruding end of each piston rod and extended forwardly under the corresponding guideway, means securing the bottom of each guide to the corresponding horizontal member, and means introducing compressed air from the compressed air source simultaneously into the master cylinders and exhausting the compressed air therefrom.

3. A loading and unloading elevator in combination with a motor truck having a compressed air source according to claim 1 in which the means coacting with the guides and the compressed air source vertically reciprocating the platform adjacent the channel members comprises an auxiliary piston vertically disposed on the extended end of each horizontal member and forwardly of the guide, means through the longitudinal slot of each guideway securing the cylinder to the corresponding guide, an inverted L-shaped bracket disposed on the upwardly directed end of the piston rod of each piston, the upright portion of each bracket being spaced from the front of the corresponding piston cylinder and extended downwardly substantially to the plane of the horizontal supports, a tie rod disposed between the free ends of the brackets, a platform pivotally disposed on the tie rod, means introducing compressed air from the compressed air source simultaneously into the auxiliary cylinders and exhausting the air therefrom, means coacting with the tie rod maintaining the platform in a plane perpendicular to the plane of the channel members, and means coacting with the channel members maintaining the platform in a plane parallel to the plane of the channel members.

4. A loading and unloading elevator device for use in combination with the tractor unit of a trailer truck, comprising a vertical frame member, engageable with the forward chassis of the truck in a position in which the top of the frame is below the normal field of vision of the driver and the bottom of the frame is above the level of the ground; a rotatable member being fixed through an engagement means at one of its ends to the lower portion of said vertical frame and rotatable from a position horizontal to the ground to a position substantially adjacent the vertical frame member; said engagement means vertically reciprocating said rotatable member in said frame; said rotatable member being capable of supporting the object to be moved; and a source of power for lowering and raising said rotatable member.

5. A loading and unloading elevator device for use in combination with the tractor unit of a trailer truck, comprising a vertical frame member, engageable with the forward chassis of the truck in a position in which the top of the frame is below the normal field of vision of the driver and the bottom of the frame is above the level of the ground; a rotatable member being fixed through an engagement means at one of its ends to the lower portion of said vertical frame and rotatable through an angle of substantially 90° from a position horizontal to the ground to a position substantially adjacent the vertical frame member; a latching means for supporting said rotatable member in an upright position; said engagement means vertically reciprocating said rotatable member in said frame to the ground and upward; said rotatable member being capable of supporting the object to be moved; and a source of power for lowering and raising said rotatable member.

6. A loading and unloading elevator device for use in combination with the tractor unit of a trailer truck, comprising a vertical frame member, engageable with the forward chassis of the tractor unit in a position in which the top of the frame is below the normal field of vision of the driver and the bottom of the frame is above the level of the ground; a rotatable member being fixed through an engagement means at one of its ends to the lower portion of said vertical frame and rotatable through an angle of substantially 90° from a position horizontal to the ground to a position substantially adjacent the vertical frame member; a latching means for supporting said rotatable member in an upright position; said engagement means vertically reciprocating said rotatable member in said frame from the ground to the top of said frame; said rotatable member being capable of supporting the object to be moved; and a source of power for lowering and raising said rotatable member.

7. A loading and unloading elevator device in combination with the tractor unit of a trailer truck, comprising a vertical frame member, engageable with the forward chassis of the truck in a position in which the top of the frame is below the normal field of vision of the driver and the bottom of the frame is above the level of the ground; a rotatable member being fixed through an engagement means at one of its ends to the lower portion of said vertical frame and rotatable from a position horizontal to the ground to a position substantially adjacent the vertical frame member; said engagement means vertically reciprocating said rotatable member in said frame; said rotatable member being capable of supporting the object to be moved; and a source of power for lowering and raising said rotatable member.

8. A loading and unloading elevator device in combination with the tractor unit of a trailer truck, comprising a vertical frame member, engageable with the forward chassis of the truck in a position in which the top of the frame is below the normal field of vision of the driver and the bottom of the frame is above the level of the ground; a rotatable member being fixed through an engagement means at one of its ends to the lower portion of said vertical frame and rotatable through an angle of substantially 90° from a position horizontal to the ground to a position substantially adjacent the vertical frame member; a latching means for supporting said rotatable member in an upright position; said engagement means vertically reciprocating said rotatable member in said frame to the ground and upward; said rotatable member being capable of supporting the object to be moved; and a source of power for lowering and raising said rotatable member.

9. A loading and unloading elevator device in combination with the tractor unit of a trailer truck, comprising a vertical frame member, engageable with the forward chassis of the tractor unit in a position in which the top of the frame is below the normal field of vision of the driver and the bottom of the frame is above the level of the ground; a rotatable member being fixed through an engagement means at one of its ends to the lower portion of said vertical frame and rotatable through an angle of substantially 90° from a position horizontal to the ground to a position substantially adjacent the vertical frame member; a latching means for supporting said rotatable member in an upright position; said engagement means vertically reciprocating said rotatable member in the frame from the ground to the top of said frame; said rotatable member being capable of supporting the object to be moved; and a source of power for lowering and raising said rotatable member.

HARRY LEHRMAN.

References Cited in the file of this patent

UNITED STATES PATENTS

| Number | Name | Date |
|---|---|---|
| 1,280,090 | Schrottky | Sept. 24, 1918 |
| 1,426,116 | Simons | Aug. 15, 1922 |